United States Patent [19]
Machida et al.

[11] Patent Number: 6,057,919
[45] Date of Patent: May 2, 2000

[54] APPARATUS AND METHOD FOR MEASURING CHARACTERISTICS OF OPTICAL PULSES

[75] Inventors: Susumu Machida; Shudong Jiang, both of Musashino, Japan; Yoshihisa Yamamoto, Stanford, Calif.

[73] Assignees: Japan Science and Technology Corporation; Yoshihisa Yamamoto, both of Japan

[21] Appl. No.: 08/893,647

[22] Filed: Jul. 11, 1997

[30] Foreign Application Priority Data

Jul. 16, 1996 [JP] Japan ................................ 8-185235

[51] Int. Cl.[7] ........................................ G01B 9/02
[52] U.S. Cl. ................................ 356/345; 356/349
[58] Field of Search ............................ 356/346, 349, 356/345

[56] References Cited

U.S. PATENT DOCUMENTS

| | | | |
|---|---|---|---|
| 4,705,397 | 11/1987 | Tsuchiya et al. | 356/345 |
| 4,907,885 | 3/1990 | Globig et al. | 356/349 |
| 4,973,160 | 11/1990 | Takiguchi et al. | 356/345 |
| 5,530,544 | 6/1996 | Trebino et al. | 356/345 |
| 5,585,913 | 12/1996 | Hariharan et al. | 356/4.09 |

Primary Examiner—Robert H. Kim
Assistant Examiner—Andrew H. Lee
Attorney, Agent, or Firm—Lorusso & Loud

[57] ABSTRACT

In an optical pulse characteristic measuring apparatus, optical pulses to be measured are introduced at the incident end, and split at an beam splitter. A first resultant light beam is reflected by a mirror as a local oscillation light of homodyne detection and is adjusted in a delay element so as to have the same optical path length as that of the second resultant light beam. Subsequently, the first light beam is led to an optical mixer. The second light beam is reflected by a mirror, which is controlled by a signal from a signal generator for modulation of optical path length difference. The second light beam is then reflected by a delay element and is led to the optical mixer. The two light beams combined at the optical mixer are detected by optical detectors. The AC signal component generated by modulation of the optical path length difference is amplified up to a measurable voltage by a differential amplifier. A bandpass filter passes only the AC signal component generated by modulation of the optical path length difference, thereby improving the S-N ratio. By using an AC voltmeter to measure the AC signal component corresponding to the delay of the delay element for correlation length measurement, the auto-correlation signal can be obtained. Accordingly, it is possible to measure the characteristics of optical pulses with high sensitivity and high stability.

4 Claims, 4 Drawing Sheets

APPARATUS AND METHOD FOR MEASURING CHARACTERISTICS OF OPTICAL PULSES

BACKGROUND OF THE INVENTION

1. Field of the Invention

The present invention relates to an apparatus and a method for measuring characteristics of optical pulses.

2. Description of the Related Art

When the characteristics of optical pulses are directly measured by use of an optical detector, especially when the pulse width of the optical pulses is on the order of pico-seconds or femto-seconds, values indicating the pulse width of the measured pulses become broader than the actual values due to the frequency characteristics of the entire measuring system, including the optical detector. Therefore, use of this method is limited to measuring characteristics of pulses whose pulse widths are larger than 10 pico-seconds. When streak cameras or optical-sampling oscilloscopes are used, the measuring limit is on the order of hundreds of femto-seconds.

Although the auto-correlation method using non-linear optical crystal can detect pulses having a pulse width as short as 0.1 femto-second, it cannot detect weak optical pulses because it utilizes the higher-order non-linear optical effect. Moreover, since the measurable pulse width depends on the length of the crystal and the measurable wavelength depends on the material of the crystal, different crystals must be used for different purposes.

As a pulse width measuring method with highly sensitivity, the heterodyne method has been proposed (Reference: Tomaru et al.: "Optical pulse auto-correlation method using the heterodyne method," 43rd Applied Physics Symposium 26a-A-2,1996). In this method, the measured pulse width becomes broader than the actual one, due to the secondary dispersion of the frequency modulator used in the measuring optical system. Moreover, since optical detection of the heterodyne component of the higher harmonics is required, the optical detector must have an operation band width as broad as 10 GHz.

However, in order to use the above-described conventional techniques to measure the pulse characteristics of optical pulses, a broadband type optical detector and light of a high intensity are required, and sufficient measurement sensitivity is not obtained.

SUMMARY OF THE INVENTION

An object of the present invention is to solve the above-described problems and to provide an apparatus and method for measuring characteristics of optical pulses with high sensitivity and high stability which do not require a broadband type optical detector.

In accordance with the present invention, an apparatus and method for measuring characteristics of optical pulses in an input light beam using autocorrelation techniques modulates the optical path length of one of a pair of light beams formed by splitting the input light beam. The AC component of modulation is detected in the product of mixing the split light beams to indicate characteristics of the pulses in the input beam.

In a further aspect, chopping of one of the split beams combined with synchronous detection of the product of the mixed split beams is employed to further enhance measurement of pulse characteristics in the input light beam.

Owing to the structural features described above, the following effects are realized:

Accurate measurement of the optical pulse characteristics, especially optical pulse width, and detection of the optical pulses can be realized by measuring the amplitude of a stable AC signal generated by modulation of the optical path length difference of the interferometer, without stabilization of the interferometer.

Variations in the optical path length difference in the homodyne interferometer directly causes a change in the output signal, and generally requires stabilization of the interferometer. Typically, negative feedback control is used for stabilization.

However, in order to measure the pulse width of optical pulses through use of the auto-correlation method, the measurement procedure is started without an overlapping of optical pulses, i.e., without an output of the interferometer.

Therefore, a control signal is not available for stabilization, and stabilization is impossible. Moreover, one of the optical paths of the interferometer is changed in order to obtain an correlation length. If the interferometer is controlled for stabilization at this time, the control signal changes in accordance with the change in the optical path, and separation of the control signal and the measurement signal becomes difficult.

If one of the optical path lengths is modulated without stabilization of the interferometer, the interference stripes change in accordance with the modulation speed and the amplitude, and an AC signal is generated. The amplitude of this AC signal is the same as that of the visibility. Therefore, the auto-correlation signal is obtained by measuring the amplitude of the output of the homodyne detection while changing the optical path length difference of the interferometer. Since in this case the instability due to the unstable interferometer is converted to the changes of phase and frequency, the amplitude change becomes very small.

This interferometer uses the homodyne detection method. Therefore, by using a local oscillation light of sufficient intensity in one of the optical paths, the intensity of the signal light on the other optical path can be very small, and sensitive optical pulse detection can be realized. Moreover, the required bandwidth for detection of an AC signal that is generated through modulation of the optical path length difference is sufficient for the optical detector used here. For example, if a triangular wave with a frequency of 100 Hz and an amplitude of 10 times the optical wavelength is used for the optical path modulation, the frequency of the generated AC signal becomes 2 kHz, which can be detected with an ordinary optical detector.

The pulse width of the optical pulses to be measured is obtained by measuring the amplitude of the output of the homodyne detection while changing the optical path length difference. When the width at half-maximum of the auto-correlation signal is $\Delta L$ (m), the pulse width of the transform limit pulses $\Delta \tau$ becomes:

$$\Delta \tau = \Delta L/K \text{ (sec)}. \tag{1}$$

If the intensity profile of the optical pulses is $Sech^2$-type, K becomes $6.5 \times 10^8$.

Since the optical path length difference is modulated, the resolution of pulse width measurement is limited. If the modulation amplitude is half the wavelength of the optical pulses to be measured, one cycle period of the AC signal is generated by a single reciprocal amplitude change, thus enabling amplitude measurement of the AC signal.

Therefore, a half wavelength corresponds to the resolution of the pulse location. If the optical wavelength is 1 $\mu$m and the intensity profile of optical pulse is $Sech^2$-type, from Equation (1) the resolution becomes about 1.5 fsec, which is very high resolution.

DESCRIPTION OF THE PREFERRED EMBODIMENTS

Preferred embodiments of the present invention will now described in detail with reference to the drawings.

Figure 1:
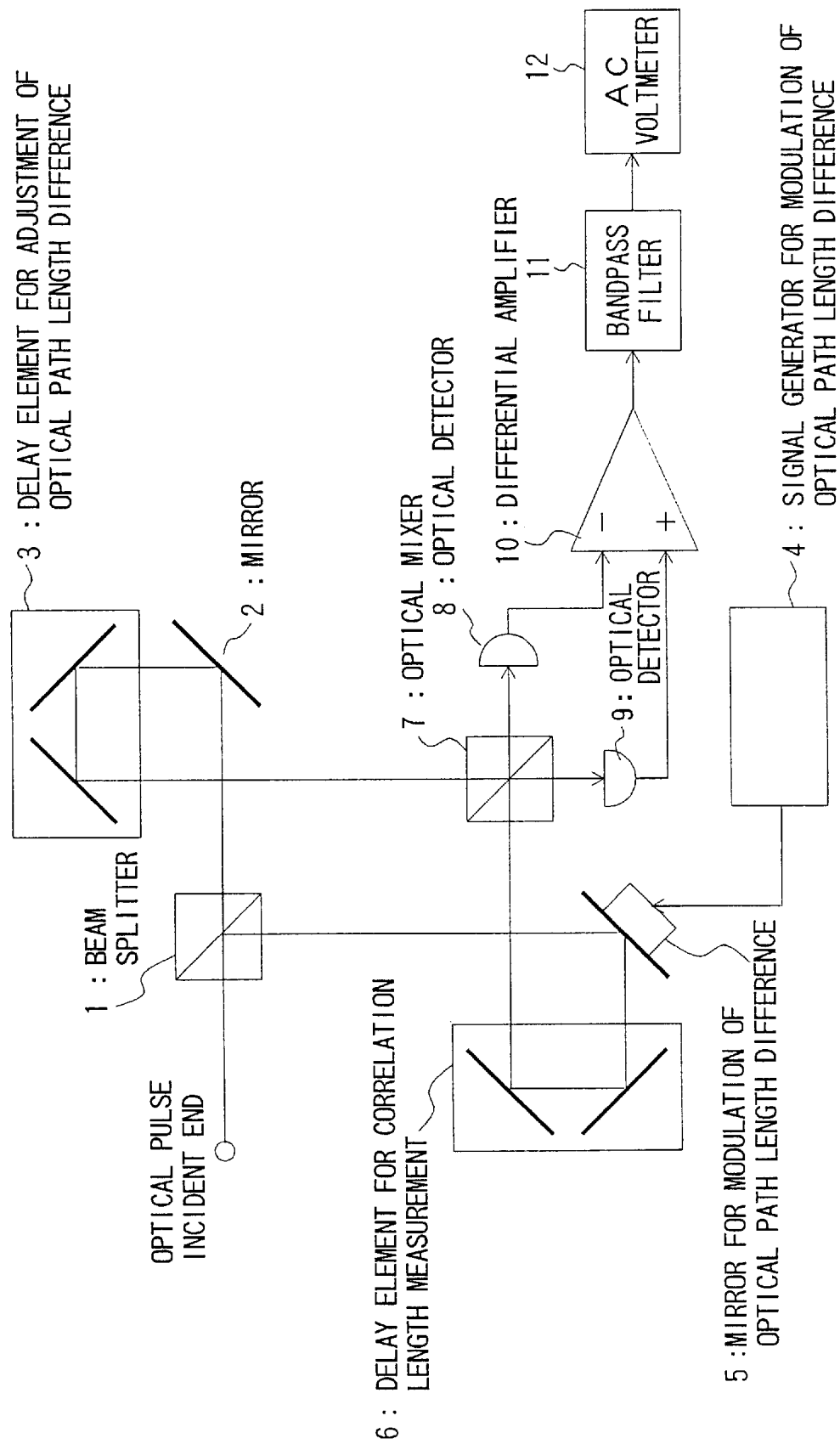
FIG. 1 is a schematic diagram of an optical pulse characteristic measuring apparatus according to a first embodiment of the present invention.

FIG. 1 is a schematic diagram of an optical pulse characteristic measuring apparatus according to a first embodiment of the present invention.

As shown in FIG. 1, the optical pulse characteristic measuring apparatus comprises an beam splitter 1, a mirror 2, a delay element 3 for adjustment of optical path length difference, a signal generator 4 for modulation of optical path length difference, a mirror 5 for modulation of optical path length difference, a delay element 6 for correlation length measurement, an optical wave mixer 7, optical detectors 8 and 9, a differential amplifier 10, a bandpass filter 11 and an AC voltmeter 12.

The signal generator 4 for modulation of optical path length difference and the mirror 5 for modulation of optical path length difference serve as means for modulation of optical path length, while the differential amplifier 10, the bandpass filter 11, and the AC voltmeter 12 serve as means for measuring the amplitude of an AC signal.

The beam splitter 1 splits the optical pulses to be measured, and the optical mixer 7 mixes two optical beams. Half mirrors, non-polarized beam splitters or optical directional couplers may be used.

The mirror 5 for modulation of optical path length difference is sufficient if it produces oscillation of several times the optical wavelength, and may comprise a piezo element and a mirror attached to the piezo element. Moreover, the action of the mirror 5 for modulation of path length difference is to continuously change the phase of the light, and alternative construction can be used if the same level of phase change is obtained.

The delay element 6 for correlation length measurement is used when the pulse width is measured, and its delay distance depends on the pulse width of the optical pulses to be measured. The delay element 3 for adjustment of optical path length difference is used for equalization of the two optical path lengths between the beam splitter 1 and the optical wave mixer 7. The mirror 5 for modulation of the optical path length difference is optionally placed at one of the delay elements.

Although a method using a single optical detector for detecting the light output of the optical mixer 7 is possible, the present embodiment including two optical detectors 8 and 9 and a differential amplifier 10 is obviously superior in terms of S-N ratio, because the amplitude noise in the incident light is suppressed and the noise is of the shot noise level.

Referring to FIG. 1, the optical pulses to be measured are introduced at the incident end, and split at the beam splitter 1. One of the resultant light beams (a first light beam) is reflected by the mirror 2 as a local oscillation light of homodyne detection and is adjusted in the delay element 3 so as to have the same optical path length as that of the other light beam (a second light beam). Subsequently, the first light beam is led to the optical mixer 7. The second light beam is reflected by the mirror 5, which is controlled by the signal from the signal generator 4 for modulation of optical path length difference. The second light beam is then reflected by the delay element 6 and is led to the optical mixer 7.

The two optical signals combined at the optical mixer 7 are detected by the optical detectors 8 and 9. The AC signal component generated by modulation of the optical path length difference is amplified up to a measurable voltage by the differential amplifier 10. The bandpass filter 11 passes only the AC signal component generated by modulation of the optical path length difference, thereby improving the S-N ratio. By using the AC voltmeter 12 to measure the AC signal component corresponding to the delay of the delay element 6 for correlation length measurement, the auto-correlation signal can be obtained.

If a bandpass filter is used, the S-N ratio is improved when the AC signal component generated by modulation of the optical path length difference is measured in the first embodiment.

Next is described the method for detecting weak optical pulses through use of the first embodiment. The bandpass filter 11 is, of course, adjusted so as to pass the AC signal component generated by modulation of the optical path length difference.

(1) The splitting ratio of the beam splitter at the incident side is adjusted so as to obtain minimum sufficient light intensity at the local oscillation side.

(2) The light path of light that passes through, is reflected by, or generated by a test sample placed at the signal light side is adjusted to be the same as that at the local oscillating light side, through adjustment of the delay element 3 for adjustment of optical path length difference.

(3) The AC signal component generated by the modulation of the optical path length is maximized through adjustment of the delay element 3 for adjustment of optical path length difference and the delay element 6 for correlation length measurement.

(4) The intensity of the pulses to be measured is obtained through comparison of the amplitude of an AC signal representing the light on the signal light side which has a known intensity.

Next is described a method of measuring the phase characteristics of the optical pulses through use of the first embodiment.

The phase of the output AC signal of this embodiment represents the phase difference between the local oscillation light and the signal light.

Therefore, the phase characteristics of the optical pulses can be determined through measurement of the phase of this output AC signal. Measurement of the phase requires another AC signal of standard phase, which cannot be obtained in this embodiment. Therefore, there is provided a separate standard AC signal of a frequency substantially equal to that of the output AC signal, and the phase difference between the standard signal and the output AC signal is measured by a phase detector. However, the output of the phase detector includes a static phase difference between the standard signal and the output AC signal. The static phase difference is substantially linear if the measurement time is short, and the phase characteristics of the optical pulses can be obtained by subtracting this linear component from the measured result.

On the other hand, through use of detection means of an optical scanning tunnel microscope, local time optical splitting to be measured and local coherent light emission of the test sample can be sensitively measured.

Next is described a second embodiment.

Figure 2:
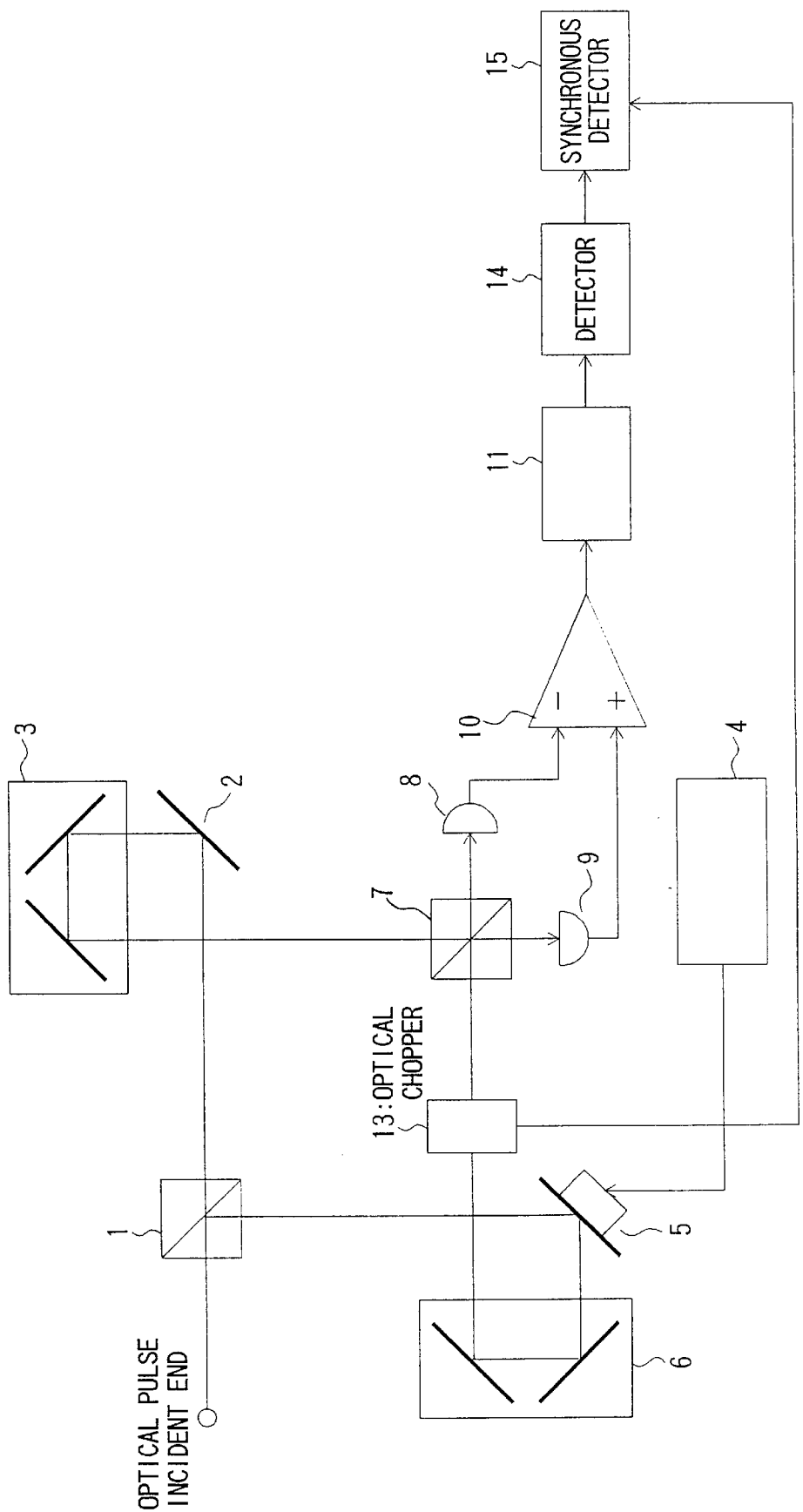
FIG. 2 is a schematic diagram of an optical pulse characteristic measuring apparatus according to a second embodiment of the present invention.

FIG. 2 is a schematic diagram of a second embodiment of the optical pulse characteristic measuring apparatus of the present invention. The same numerals are assigned to elements corresponding to those in FIG. 1, and detailed descriptions of these elements will be omitted.

The present embodiment is characterized by the addition of an optical chopper 13, a detector 14, and a synchronous detector 15 to the first embodiment. The optical chopper 13 serve as means for chopping the light, and the synchronous detector 15 serve as synchronous detection means for measuring amplitude of the AC signal detector output synchronously with the operation of the optical chopper 13.

According to the present embodiment, an ordinary RC type smoothing circuit can be disposed after the detector 15. However, if a low pass filter or a bandpass filter having steep cut-off characteristics is used, the S-N ratio of the high efficiency synchronous signal component can be improved. An ordinary lock-in amplifier may be used as the means for synchronous detection.

Generally, if synchronous detection is performed, higher sensitivity is obtained. However, synchronous detection through use of the AC signal generated by the modulation of the optical path length difference is impossible because the reference signal is not available. Therefore, if the light is chopped through use of the optical chopper 13 disposed on the light path, the AC signal generated by modulation of the optical path length difference is chopped. If the chopped AC signal component is detected, a signal which is synchronized with the operation of the chopper 13 is generated, and synchronous detection is realized.

Next is described a test result obtained from the second embodiment.

Figure 3:
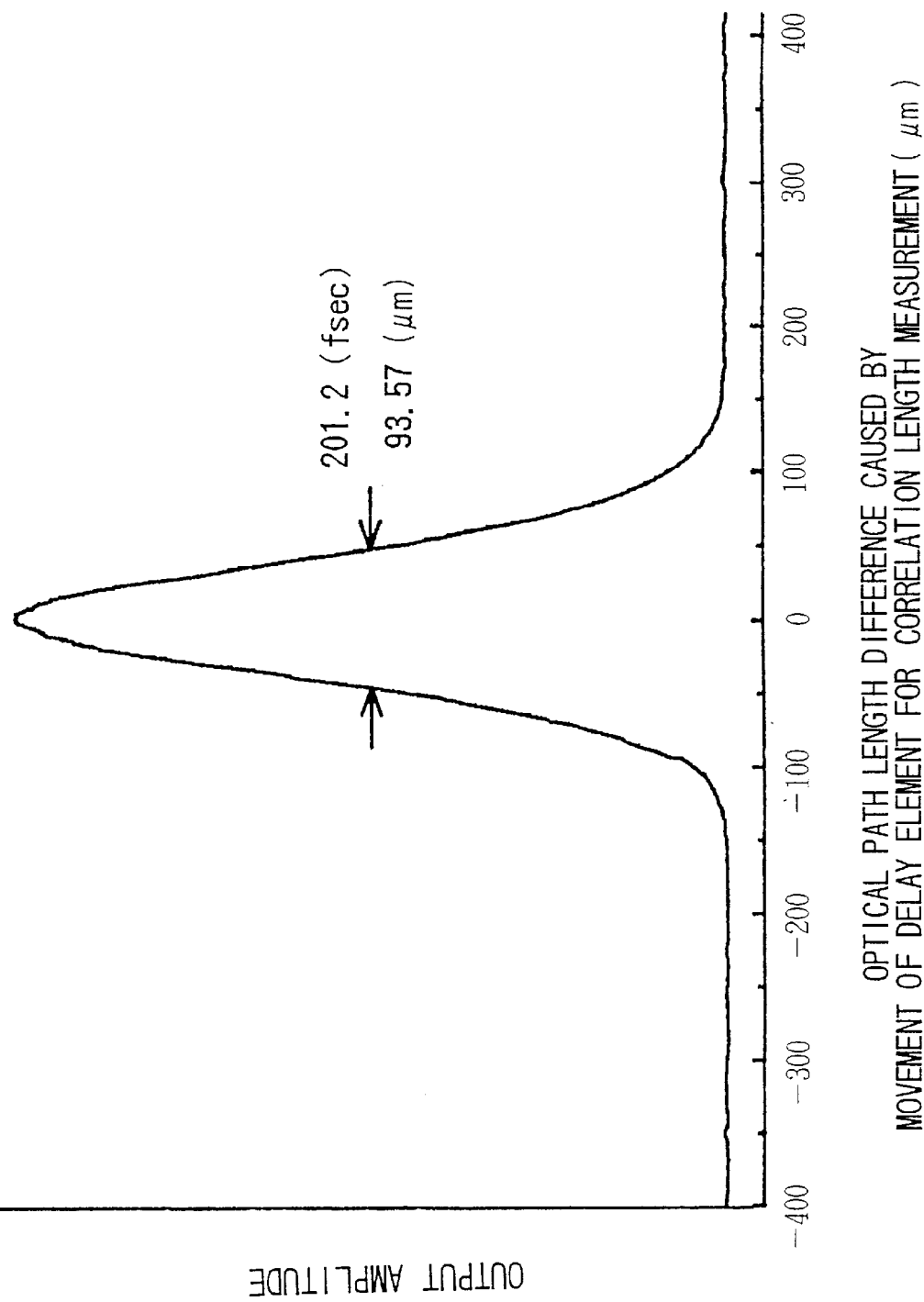
FIG. 3 is a graph showing the result of a measurement in which the auto-correlation signal of a passive mode synchronous titan-sapphire pulse laser was measured by the optical pulse characteristic measuring apparatus according to the first embodiment.

FIG. 3 shows the result of a measurement in which the homodyne detection output of the transform limit pulses from the titan-sapphire laser according to the first embodiment. In this graph, the X axis represents the optical path length difference resulting from the moving distance of the delay element 6 for correlation length measurement, and the Y axis represents the amplitude of the output of the synchronous detector 15.

The intensity on the local oscillating side was 5 mW, and the intensity on the signal side was 15 fW. The resultant optical path length difference of half-maximum width of the auto correlated wave shape was 93.57 µm, and the pulse width calculated from Equation (1) became 144 fsec. These results agree with the values measured through use of a non-linear optical crystal.

Figure 4:
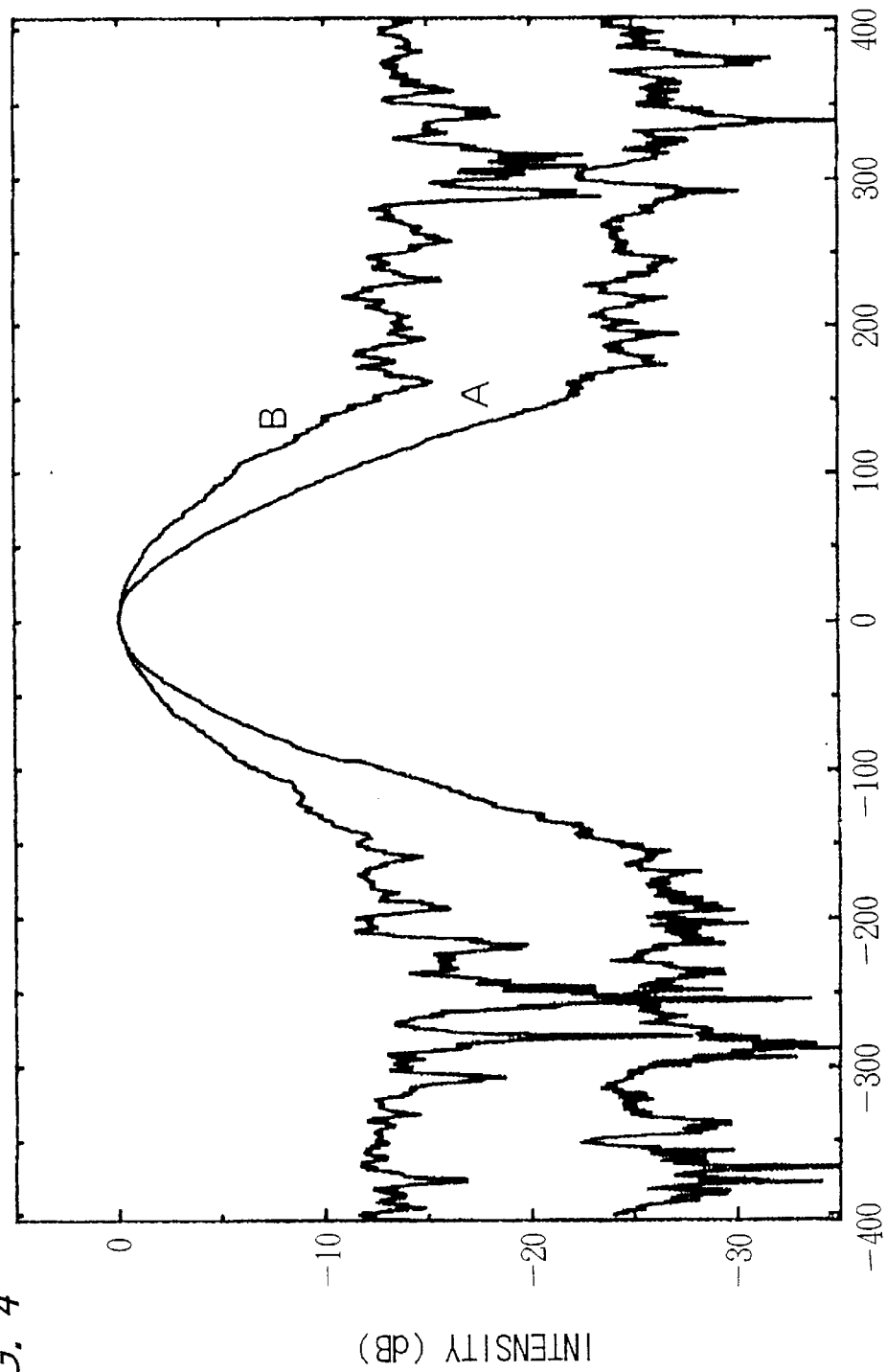
FIG. 4 is a graph showing measurement the results of a measurement in which the auto-correlation signals of passive mode synchronous titan-sapphire pulse lasers were measured by the optical pulse characteristic measuring apparatuses according to the second and first embodiments.

Curve A shown in FIG. 4 represents the test result of measuring obtained through use of the optical pulse characteristic measuring apparatus according to the second embodiment, the pulses from the titan-sapphire laser (FIG. 3). As can be clearly seen, the S-N ratio of larger than 25 dB was secured. In this case, a lock-in amplifier was used as the synchronous detector and the integration time was set to 1 second. Curve B in FIG. 4 represents the test result obtained through use of the optical pulse characteristic measuring apparatus according to the first embodiment. Comparing the two results in this graph, we can see that the results of the second embodiment are more than 10 dB higher in S-N ratio and superior in terms of sensitivity. The amplitude of the output of the homodyne detection is proportional to the square root of the product of the respective intensities of the local oscillation light and the signal light. Therefore, under this measurement condition, if the splitting ratio of the incidence side beam splitter is set to 1:1, optical pulse width measurement can be performed for incidence light energy of about 8.6 nW with an S-N ratio of higher than 25 dB, which represents excellent sensitivity.

Although the configurations shown in FIGS. 1 and 2 use a Mach-Zehnder interferometer, a Michelson interferometer can be substituted for the same use. Optical fibers can also be used in some of the components.

The present invention is not limited to the above-described embodiments. Numerous modifications and variations of the present invention are possible in light of the spirit of the present invention, and they are not excluded from the scope of the present invention.

As explained in detail above, the present invention provides the following effects:

(1) Since the homodyne method is used, very high sensitivity is realized;

(2) Since the AC signal component generated by modulating an optical path length difference is simply measured with no requirement for interferometer stabilization, very high stability is realized without using a broadband type optical detector, and the configuration becomes simple;

(3) Very weak optical pulses can be detected; and (4) The phase of optical pulses can also be measured.

What is claimed is:

1. An apparatus for measuring characteristics of optical pulses comprising:

(a) a beam splitter for splitting an input beam of optical pulses to be measured into a pair of light beams output therefrom;

(b) means for modulating an optical path length of one of the pair of light beams output from said beam splitter;

(c) means for changing the optical path length of one of said pair of light beams output from said beam splitter relative to the other of said pair of light beams output from said beam splitter;

(d) an optical mixer for mixing the pair of output light beams;

(e) an optical detector for detecting a light beam output from said optical mixer; and (f) means for measuring the amplitude of an AC signal output from said optical detector.

2. A method for measuring characteristics of optical pulses in an input light beam comprising the steps of:

(a) splitting the input beam of optical pulses to be measured into first and second beams, b) modulating an optical path length of one of the first and second light beams, (c) changing an optical path length of one of the first and second light beams relative to the other of said first and second light beams, (d) mixing the first and second light beams, (e) detecting a light beam output from said optical mixer, and (f) measuring the amplitude of an AC signal output from said optical detector;

wherein said modulating the optical path length of one of the first and second light beams and said detecting the light beam from the optical mixer performs heterodyne detection in order to measure the AC signal component which is generated by the modulation of the optical path length.

3. An apparatus for measuring characteristics of optical pulses comprising:

(a) a beam splitter for splitting an input beam of optical pulses to be measured into a pair of light beams output therefrom;

(b) means for modulating the optical path length of one of the pair of light beams output from said beam splitter;

(c) means for changing the optical path length of one of said pair of light beams output from said beam splitter relative to the other of said pair of light beams output from said beam splitter;

(d) means for chopping one of said pair of light beams output from said beam splitter;

(e) an optical mixer for mixing the pair of output light beams;

(f) an optical detector for detecting a light beam from said optical mixer;

(g) detecting means for detecting the amplitude of an AC signal output from said optical detector; and (h) synchronous detecting means for detecting the amplitude of the output from said detecting means synchronously with the operation of said light chopping means.

4. A method for measuring characteristics of optical pulses in an input light beam comprising the steps of:

(a) splitting the input beam of optical pulses to be measured into first and second beams, (b) modulating an optical path length of one of the first and second light beams, (c) changing an optical path length of one of said first and second light beams relative to the other of said first and second light beams, (d) chopping one of the first and second light beams, (e) mixing the first and second light beams, (f) detecting a light beam generated by said mixing, (g) detecting the amplitude of an AC signal produced from the detecting of the light beam, and synchronously detecting the amplitude of an AC modulation component in the detected AC signal from the detecting of the light beam in synchronism with the chopping of one of the first and second light beams;

wherein said modulating the optical path length of one off the first and second light beams, said chopping of one of said first and second light beams, said detecting of the amplitude of an AC signal produced from the detecting of the light beam and said synchronously detecting the amplitude of an AC modulation component in the detected AC signal from the detecting of the light beam performs heterodyne detection in order to detect and measure the AC modulation component which is generated by the modulation of the optical path length.

* * * * *

UNITED STATES PATENT AND TRADEMARK OFFICE
CERTIFICATE OF CORRECTION

| | |
|---|---|
| PATENT NO. : 6,057,919 | Page 1 of 1 |
| DATED : May 2, 2000 | |
| INVENTOR(S) : Machida et al. | |

It is certified that error appears in the above-identified patent and that said Letters Patent is hereby corrected as shown below:

<u>Title page,</u>
Under the heading "References Cited", "U.S. 4,907,885 3/1990" should read -- U.S. 4,907,885 5/1990 --.

<u>Column 2,</u>
Line 58, "108" should read -- $10^8$ --.

<u>Column 8,</u>
Line 17, before "synchronously" insert -- (h) --;
Line 23, delete "off" insert -- of --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*